United States Patent
Hayashi et al.

(10) Patent No.: US 7,151,893 B2
(45) Date of Patent: Dec. 19, 2006

(54) DATA TRANSMISSION SYSTEM, TRANSMISSION METHOD OF OPTICAL NETWORK MONITOR CONTROL SIGNAL, AND NODE

(75) Inventors: Michiaki Hayashi, Kamifukuoka (JP); Tomohiro Otani, Kamifukuoka (JP); Masatoshi Suzuki, Kamifukuoka (JP)

(73) Assignee: KDDI Corporation, Tokyo (JP)

(*) Notice: Subject to any disclaimer, the term of this patent is extended or adjusted under 35 U.S.C. 154(b) by 701 days.

(21) Appl. No.: 10/402,278

(22) Filed: Mar. 27, 2003

(65) Prior Publication Data
US 2003/0185564 A1  Oct. 2, 2003

(30) Foreign Application Priority Data
Mar. 29, 2002  (JP) .............................. 2002-094478

(51) Int. Cl.
H04B 14/02 (2006.01)
(52) U.S. Cl. .............................. 398/7; 398/19; 398/33; 398/48
(58) Field of Classification Search .................... 398/7, 398/4, 19, 30, 33, 57, 48
See application file for complete search history.

(56) References Cited

U.S. PATENT DOCUMENTS
7,035,537 B1 * 4/2006 Wang et al. ................... 398/7

* cited by examiner

Primary Examiner—Leslie Pascal
(74) Attorney, Agent, or Firm—Christie, Parker & Hale LLP

(57) ABSTRACT

To realize a highly reliable monitor control signal network at low costs, a data transmission system comprises a first network to optically transmit a data signal and a monitor control signal, first and second nodes connecting to the first network, and a second network capable of transmitting the monitor control signal. The first node comprises a demultiplexer to demultiplex the data signal and the monitor control signal out of the signal light from the first network, a signal distributor having a plurality of input ports and a plurality of output ports to distribute the data signal demultiplexed by the demultiplexer into designated output port, a controller to control the signal distributor and to monitor each part in the first node, a first selector to select one of the monitor control signal demultiplexed by the demultiplexer and the other monitor control signal entered from the second network and to apply the selected one to the controller, a second selector to output the monitor control signal output for the second node output from the controller toward one of the first network and the second networks, and a multiplexer to multiplex the monitor control signal output for the first network output from the second selector and the data signal output from the signal distributor and to output the multiplexed signals onto the first network.

25 Claims, 5 Drawing Sheets

DATA TRANSMISSION SYSTEM, TRANSMISSION METHOD OF OPTICAL NETWORK MONITOR CONTROL SIGNAL, AND NODE

CROSS REFERENCE TO RELATED APPLICATIONS

This application claims priority to Japanese Patent Application No. 2002-094478, filed Mar. 29, 2002, the entire contents of which are incorporated herein by reference.

FIELD OF THE INVENTION

This invention generally relates to a data transmission system, a transmission method of an optical network monitor control signal, and a node.

BACKGROUND OF THE INVENTION

In a large-scale network, a system to remotely monitor each node connecting to the network is indispensable.

As a configuration to transmit a monitor signal, a control signal, and a status signal (generically referred to hereinafter as a "monitor control signal") between a monitor center and each node, one typical type is to multiplex a monitor control signal on a network to transmit a data signal itself, hereinafter referred to as a "signal network", and the other is to provide another external network besides the signal network to transmit a monitor control signal through the external network. Such external networks used as a monitor control network comprise for example public networks and/or private networks.

In an optical network to transmit a WDM optical signal of 10 Gb/s per wavelength, for example, a monitor control signal is 2 Mbit/s or 155 Mbit/s.

Generally, each node comprises a cross connector or an add/drop multiplexer to transmit a signal with another node and with a transceiver terminal, and a controller having functions to transmit/receive a monitor control signal and to control the cross connector or the add/drop multiplexer according to the monitor signal or the control signal.

In one configuration, a controller disposed on a specific node functions as a monitor center, and in the other configuration, a monitor center is provided besides a controller disposed on each node. In the latter, one possible case is to connect the monitor center with the controller of each node and the other possible case is to connect the monitor center with a controller of a specific node and to transmit/receive a monitor control signal to/from controllers of the other nodes through the controller of the specific node.

Main four roles of the monitor control signal are (1) monitoring an alarm signal generated from each part and informing the monitor center when an alarm signal is detected, (2) monitoring continuity and normality of signal transmission between adjacent nodes, (3) crossconnect-controlling (provisioning) of an optical path, and (4) signaling about relief (protection/restoration) protocol when any optical path has a fault.

A fault in the monitor control network gives a bad influence to the operation and maintenance of the signal network. Accordingly, the monitor control network needs to have the durability for fault and reliability equal to or even more than those of the signal network.

When an external network is used as the monitor control network, the reliability of the monitor control network depends on that of the external network to be used. Furthermore, the monitor control signal depends on the paths, the path control, the bandwidth, and the state of convergence of the external network to be used. Therefore, such an external network is unsuitable for a swift supervision/control because not only it has a long delay time but also it is unstable.

On the other hand, when a signal network is used as the monitor control network, namely in a case that a monitor control signal is transmitted through a signal network, a fault of the signal network becomes exactly a fault of the monitor control network. When fault occur in a plurality of links, several nodes are isolated in consequence. In such case, it is impossible to monitor and control the isolated nodes. Generally, a monitor control signal is assigned one wavelength and therefore it also leads to the waste of resources.

SUMMARY OF THE INVENTION

A data transmission system according to the present invention comprises a first network to optically transmit a data signal and a monitor control signal, first and second nodes connecting to the first network, and a second network capable of transmitting the monitor control signal. In particular, the first node comprises a demultiplexer to demultiplex the data signal and the monitor control signal out of the signal light from the first network, a signal distributor having a plurality of input ports and a plurality of output ports to distribute the data signal demultiplexed by the demultiplexer to a designated output port, a controller to control the signal distributor and to monitor each part in the first node, a first selector to select one of the monitor control signal demultiplexed by the demultiplexer and the other monitor control signal entered from the second network and to apply the selected one to the controller, a second selector to output the monitor control signal for the second node output from the controller toward one of the first network and the second network, and a multiplexer to multiplex the monitor control signal for the first network output from the second selector and the data signal output from the signal distributor and to output the multiplexed signals for the first network.

With the above configuration, a signal network (the first network) transmits the monitor control signal in the normal operation while an external network (the second network) transmits the monitor control signal when the signal network has a fault and therefore the system can keep even more reliability for the monitor control signal compared to that for a data signal. Transmission delay of the monitor control signal also becomes minimal. Furthermore, since it is not necessary to enhance the reliability of the external network as much as that of the signal network, the signal network can be monitored and controlled at low costs.

A data transmission system according to the present invention comprises a first network to optically transmit a data signal and a monitor control signal, first and second nodes connecting to the first network, a first data transceiver terminal to transmit/receive a data to/from the first node, a second data transceiver terminal to transmit/receive a data to/from the second node, and a second network capable of transmitting the monitor control signal. In particular, the first node comprises a signal distributor having a demultiplexer to demultiplex the data signal and the monitor control signal out of the signal light input from the first network, a signal distributor having a plurality of input ports including first and second monitor control signal input ports and a plurality of output ports including first and second monitor control signal output ports to distribute the data signal and the monitor control signal demultiplexed by the demultiplexer into respective designated output ports, a controller to control the signal distributor and to monitor each part in the first node, a first selector to select one of the monitor control signal output from the first monitor control signal output port of the signal distributor and the other monitor control signal input from the second network and to apply the selected one to the controller, a second selector to output the monitor control signal for the second node output from the controller toward one of the first monitor control signal input port of the signal distributor and the second network, and a multiplexer to multiplex the monitor control signal from the second monitor control signal output port of the signal distributor and the data signal output from the signal distributor and to output the multiplexed signals to the first optical network. The signal distributor connects the first monitor control signal input port to the second monitor control signal output port and the second monitor control signal input port to the first monitor control signal output port when the first network is normally operating.

The above configuration makes it possible that a signal network (the first network) transmits a monitor control signal in normal operation while an external network (the second network) transmits the monitor control signal when the signal network has a fault, and therefore the system can keep even more reliability for a monitor control signal than that for a data signal. Transmission delay of a monitor control signal also becomes minimal. Moreover, it is not necessary to strengthen the reliability of an external network as much as that of the signal network, and thus a signal network can be monitored/controlled at low costs. Furthermore, since a monitor control signal is distributed by a signal distributor, a channel change in the signal network becomes easy. At the same time, continuity can be checked with a loop back test and a fault part can be cut off easily.

A transmission method according to the present invention is a method to transmit a monitor control signal for a signal network to optically transmit a data signal and a plurality of nodes connecting to the signal network, comprising steps of transmitting the monitor control signal through the signal network in normal operation and transmitting the monitor control signal through an external network when the signal network has a fault.

The above configuration makes it possible that an optical network transmits a monitor control signal in normal operation while an external network transmits the monitor control signal when the optical network has a fault, and thus the system can keep even more reliability for the monitor control signal than that for the data signal. Transmission delay of a monitor control signal also becomes minimal. Moreover, it is not necessary to strengthen the reliability of the external network as much as that of the optical network, and so the signal network can be monitored/controlled at low costs.

A node according to the present invention connects a first network to optically transmit a data signal and a monitor control signal and a second network capable of transmitting the monitor control signal. The node comprises a demultiplexer to demultiplex the data signal and the monitor control signal out of the signal light input from the first network, a signal distributor having a plurality of input ports and a plurality of output ports to distribute the data signal demultiplexed by the demultiplexer to respective predetermined output port, a controller to control the signal distributor and to monitor each part, a first selector to select one of the monitor control signal demultiplexed by the demultiplexer and the other monitor control signal input from the second network and to apply the selected one to the controller, a second selector to output the monitor control signal for another node output from the controller toward one of the first network and the second network, and a multiplexer to multiplex the monitor control signal for the first network output from the second selector and the data signal from the signal distributor and to output the multiplexed signal for the first optical network.

The above configuration makes it possible to switch over a signal network (a first network) and an external network (a second network) as the transmission path of the monitor control signal at low costs. The signal network transmits the monitor control signal in normal operation while the external network transmits the monitor control signal when the signal network has a fault, and thus the system can keep even more reliability for the monitor control signal than that for the data signal. Transmission delay of the monitor control signal also becomes minimal. Moreover, it is not necessary to strengthen the reliability of the external network as much as that of the signal network, and thus the signal network can be monitored/controlled at low costs.

A node according to the present invention connects a first network to optically transmit a data signal and a monitor control signal and a second network capable of transmitting the monitor control signal. The node comprises a demultiplexer to demultiplex the data signal and the monitor control signal out of the signal light input from the first network, a signal distributor having a plurality of input ports including first and second monitor control signal input ports and a plurality of output ports including first and second monitor control signal output ports to distribute the data signal and the monitor control signal demultiplexed by the demultiplexer to respective predetermined output ports, a controller to control the signal distributor and to monitor each part, a first selector to select one of the monitor control signal from the first monitor signal output port of the signal distributor and the other monitor control signal input from the second network and to apply the selected one to the controller, a second selector to output the monitor control signal for another node output from the controller toward one of the first monitor control signal input port of the signal distributor and the second network, and a multiplexer to multiplex the monitor control signal output from the second monitor signal output port of the signal distributor and the data signal from the signal distributor and to output the multiplexed signals for the first network. The signal distributor connects the first monitor control signal input port with the second monitor control output port and the second monitor control signal input port with the first monitor control signal output port when the first network is normally operating.

The above configuration makes it possible to switch over a signal network (a first network) and an external network (a second network)as the transmission path of the monitor control signal at low costs. Also, the signal network (the first network) transmits a monitor control signal in normal operation while the external network (the second network) transmits the monitor control signal when the signal network has a fault, and thus the system can keep even more reliability for the monitor control signal than that for the data signal. Transmission delay of a monitor control signal also becomes minimal. Moreover, it is not necessary to strengthen the reliability of the external network as much as that of the signal network and therefore the signal network can be monitored/controlled at low costs. Furthermore, since a monitor control signal is distributed by the signal distributor, a channel change in the signal network becomes easier. At the same time, continuity can be checked with a loop back test and a fault part can be cut off easily.

BRIEF DESCRIPTION OF THE DRAWING

The above and other objects, features and advantages of the present invention will be apparent from the following detailed description of the preferred embodiments of the invention in conjunction with the accompanying drawings, in which.

DETAILED DESCRIPTION

Embodiments of the invention are explained below in detail with reference to the drawings.

Figure 1:
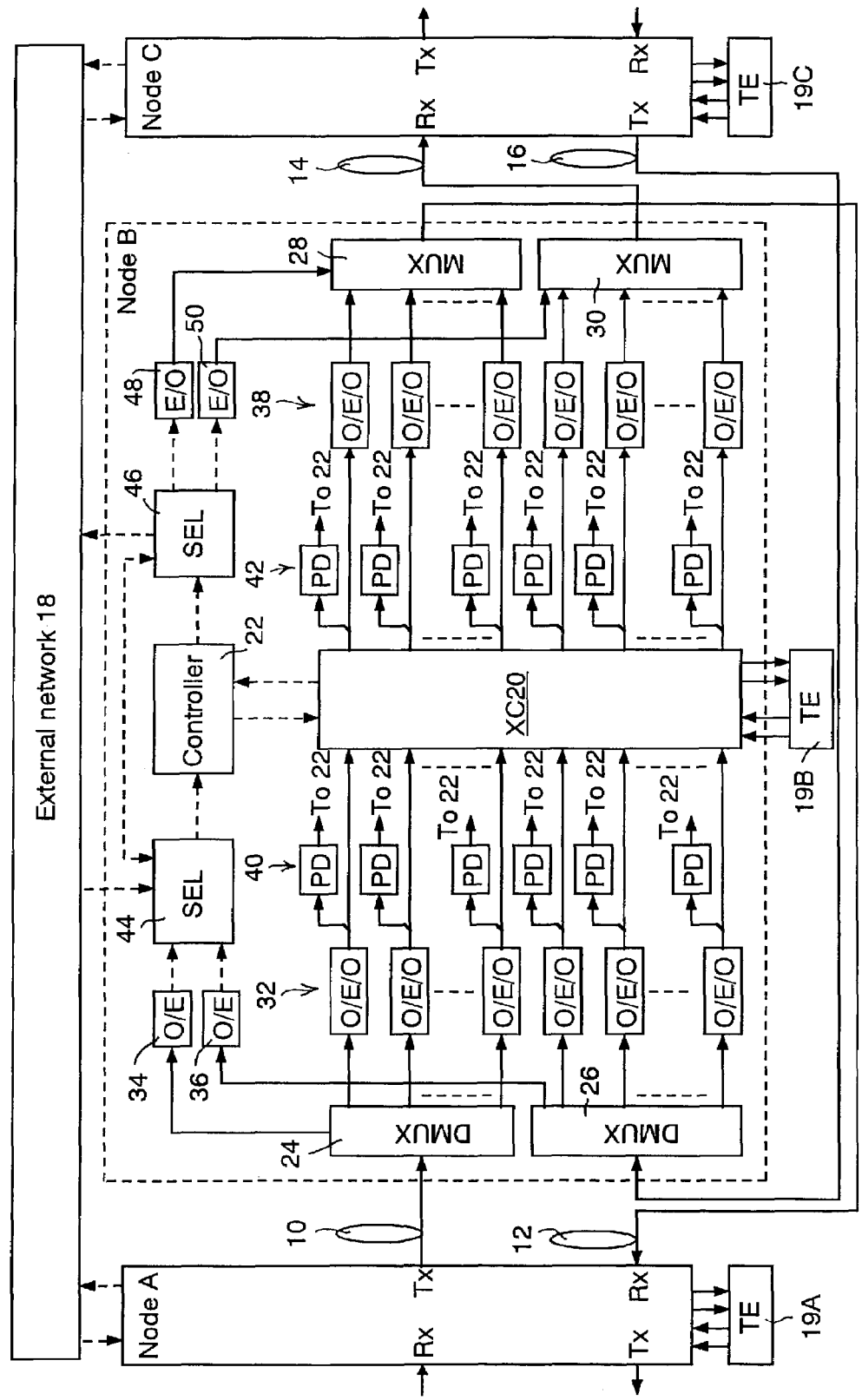
FIG. 1 shows a schematic block diagram of an embodiment according to the invention.
Figure 2:
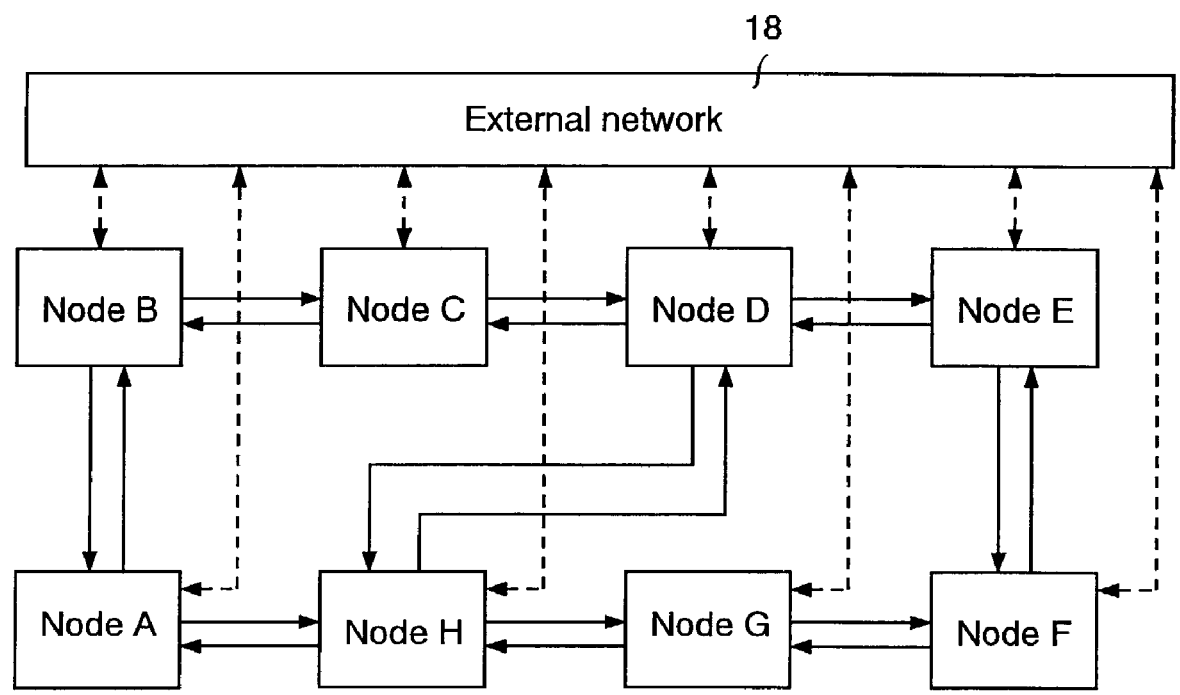
FIG. 2 shows an example of network configurations according to the embodiment.

FIG. 1 shows a schematic block diagram of an embodiment according to the present invention, and FIG. 2 shows an example of network configurations according to the embodiment. In FIG. 1, a solid line with an arrow expresses an optical signal, and a broken line with an arrow expresses an electric signal. The example is shown on the assumption that nodes A, B, and C are connected on a ring or mesh type optical network in this order. That is, the node A connects to the node B through optical fibers 10 and 12, and the node B connects to the node C through optical fibers 14 and 16. The optical fibers 10, 12, 14, and 16 form optical transmission lines of a signal network. The nodes A, B, and C are all connected to an external network 18 which works as a spare monitor control network to transmit a monitor control signal when the signal network has a fault. Although the nodes A and C connect to respective nodes through a pair of optical fibers, the nodes are omitted in FIG. 1. Although the signal network can be any type in mesh, ring, and line, it is generally a mesh or ring type.

The nodes A, B, and C connect to data transceiver terminals 19A, 19B, and 19C respectively. Each of the nodes A, B, and C transmits/receives a data to/from adjacent nodes of two directions and therefore four signal lines are provided between the data transceiver terminals 19A, 19B, 19C and their respective corresponding nodes A, B, and C.

The internal configuration and operation of the node B is described below. The node B comprises, as main elements, an optical crossconnector 20, a controller 22 to control the optical crossconnector 20, wavelength demultiplexers (DMUX) 24, 25, and wavelength multiplexers (MUX) 28, 30.

The wavelength demultiplexer 24 demultiplexes a WDM signal light entered through the optical fiber 10 from the node A into respective wavelengths. The wavelength demultiplexer 26 demultiplexes a WDM signal light entered through the optical fiber 16 from the node C into respective wavelengths. In this embodiment, one wavelength is assigned for transmission of a monitor control signal. A data signal light demultiplexed by the wavelength demultiplexer 24, 26 enters a corresponding transponder 32, a monitor control signal light demultiplexed by the wavelength demultiplexer 24 enters a photoelectric converter 34, and a monitor control light demultiplexed by the wavelength demultiplexer 26 enters a photoelectric converter 36.

The transponder 32 converts the input signal light into a signal light of another wavelength (e.g. 1.3 μm band) and applies to the optical crossconnector 20. The transponder 32 comprises a photoelectric converter to convert an input signal light into an electrical signal for a while and an electro-optical converter to convert the electrical signal into an optical signal again. The transponder 32 can further comprise an electric signal processor to perform reshaping of a signal waveform and the other processes.

Each output light from the optical crossconnector 20 enters a corresponding transponder 38 having the same function with the transponder 32. Each transponder 38 converts the input signal light into a signal light of another wavelength and applies to the wavelength multiplexers 28 and 30.

Needless to say, the optical crossconnector 20 connects to a data transceiver terminal 19B through add ports and drop ports.

A photodiode 40 is disposed at each input of the optical crossconnector 20 so as to monitor whether an input light exists, and a photodiode 42 is disposed at each output of the optical crossconnector 20 so as to monitor whether an output light exists. That is, a portion of the output light from each transponder 32 enters the corresponding photodiode 40, and a portion of each output light from the optical crossconnector 20 enters the corresponding photodiode 42. Each output from the photodiodes 40 and 42 enters a controller 22. Accordingly, the controller 22 can monitor each input port whether an input signal light exists and each output port whether an output signal light exists.

A selector 44 selects any one of the monitor control signals output from the photoelectric converters 34, 36 and the external network 18 and applies the selected one to the controller 22. A selector 46 applies the monitor control signal output for another node from the controller 22 to any one of the external network 18 and electro-optical converters 48 and 50. The selectors 44 and 46 are practically interlocked. That is, when the selector 44 selects the external network 18, the selector 46 also selects the external network 18. When the selector 44 selects the output from the photoelectric converter 34, the selector 46 selects the electro-optical converter 48. When the selector 44 selects the output from the photoelectric converter 36, the selector 46 selects the electro-optical converter 50.

The selectors 44 and 46 can be switches controlled by the controller 22. It is also applicable that the selector 44 is a switch to change input ports according to a signal input while the selector 46 is a switch to change to a corresponding connecting state according to the connecting state of the selector 44. When the monitor control signal is an IP based signal, it is possible to use a router as the selector 44, 46. When the monitor control signal is imparted virtual LAN (what is called VLAN) identifier per path, a switching hub corresponding to the VLAN can be used as the selector 44, 46. See below for further details about the operation using a router and a switching hub.

The wavelength multiplexer 28 multiplexes the output signal light (the monitor control signal light for the node A) from the electro-optical converter 48 and the signal light for the node A in the output light from the transponder 38 and outputs the multiplexed signal light for the node A through the optical fiber 12. Also, the wavelength multiplexer 30 multiplexes the output signal light (the monitor control signal light for the node C) from the electro-optical converter 50 and the signal light for the node C in the output light from the transponder 38 and outputs the multiplexed signal light for the node C through the optical fiber 14.

The controller 22 controls the switching of the optical crossconnector 20 for protection/restoration etc. according to the monitor control signal from the selector 44 and the output from each of the diodes 40 and 42. The controller 22 also informs a supervisor about its monitored result of each part including the output condition of the photodiodes 40, 42 and the connecting condition or switching operation of the optical crossconnector 20 through a monitor control signal.

The internal configuration of the node C is basically identical to that of the node B.

In the embodiment, the transmission configuration for a data signal is identical to that of an existing mesh or ring type network. A flow of a data signal between the nodes A, B, and C is briefly explained below.

The node A outputs a data signal light (a WDM signal light) onto the optical fiber 10 for the node B, the node C, or a node beyond those nodes. The data signal light propagates on the optical fiber 10 and enters the wavelength demultiplexer 24 in the node B. The node C outputs a data signal light (a WDM signal light) onto the optical fiber 16 for the node B, node A, or a node beyond those nodes. The data signal light propagates on the optical fiber 16 and enters the wavelength demultiplexer 26 of the node B.

The wavelength demultiplexer 24 demultiplexes the WDM signal light input from the optical fiber 10 into respective wavelengths, and the wavelength demultiplexer 26 demultiplexes the WDM signal light input from the optical fiber 16 into respective wavelengths. Each data signal light demultiplexed by the wavelength demultiplexers 24 and 26 enters a corresponding input port of the optical crossconnector 20 through a corresponding transponder 32.

The optical crossconnector 20 drops a signal light for the data transceiver terminal 19B in the input data signal light and applies the dropped signal light to the data transceiver terminal 19B through a drop port. The optical crossconnector 20 also applies the other input data signal lights and the data signal light input through an add port from the data transceiver terminal 19B to the wavelength multiplexers 28 and 30 through the transponder 38 via an output port assigned by the controller 22. The controller 22 controls the optical crossconnector 20 to output which data signal light from which output port.

The wavelength multiplexer 28 multiplexes the input data signal lights. The WDM signal light from the wavelength multiplexer 28 enters the node A through the optical fiber 12. Also, the wavelength multiplexer 30 multiplexes the input data signal lights. The WDM signal light from the wavelength multiplexer 30 enters the node C through the optical fiber 14.

Next, the transmission configuration of a monitor control signal light is explained below. In the embodiment, a monitor control signal transmits on an optical network on which a data signal propagates, namely on the optical fibers 10, 12, 14, and 16 in normal operation.

Assuming that the optical fiber 10 for example breaks and leads the data communication between the node A and node B disabled, a monitor control signal sent from the node A to the node B does not enter the controller 22 and output levels of all photodiodes 40 to monitor optical power of respective output light from the wavelength demultiplexer 24 reduce. Owing to the above operation, the controller 22 can detects the occurrence of faults in the optical fiber 10. Once a fault is detected, the controller 22 controls the selectors 44 and 46 so that a monitor control signal for the node A is transmitted to the node A through the external network 18. That is, the selector 46 outputs the monitor control signal for the node A output from the controller 22 onto the external network 18.

The external network 18 transmits the monitor control signal to the node A. When the monitor control signal from the node B enters from the external network 18, the node A transmits a monitor control signal for the node B through the external network 18. The selector 44 in the node B transmits the monitor control signal entered through the external network 18 from the node A toward the controller 22.

The optical fibers 14 and 16 between the nodes B and C are normal, and the selectors 44 and 46 use the optical fibers 14 and 16 for the transmission between the nodes B and C regardless of a fault in the optical fiber 10.

It is also applicable to control the selectors 44 and 46 separately so that when a transmission fault is occurred in one of a pair of optical fibers connecting between nodes, a monitor control signal propagates on the remained normal optical fiber. In that case, the controller 22 is required to control the selectors 44, 46 finely and thus loaded with an increased burden. A switching devices to interlock each other such as the selectors 44, 46 are easily available at low-cost as one unit, and therefore it is profitable to simply interlock the selectors 44 and 46 in order to cut down system costs.

As described above, an IP router or switching hub in Ethernet (Trademark) can be used as the selectors 44, 46.

When an IP router is utilized as the selectors 44 and 46, the controller 22 rewrites a routing table of the selector 46 according to whether or not a fault exists in a signal network. Although the selector 44 is enough as far as it simply has a function to transfer an input signal to the controller 22, generally a single IP router replaces the part composed of the selectors 44 and 46.

When a fixed path (e.g. a label switched path (LSP) using MPLS) for a monitor control signal is structured in each of the external network 18 and the internal network having the optical fibers 10~16 and the redundancy in the ratio of 1 to 1 is set between the paths, it is possible to get the high speed protection even if having a fault. However, to realize this configuration, all routers in the external network 18 need to have an MPLS function.

It is also applicable that the external network 18 and the internal network having the optical fibers 10~16 are distinguished and paths of a monitor control signal are switched according to whether a fault exists in the internal network, using a virtual local area network (VLAN). In this case, a switching hub is used as each of the selectors 44 and 46. The controller 22 adds to a monitor control signal a VLAN tag which is different per path and sends to the selector 46 (the switching hub). On the other hand, the selector 46 sends the monitor control signal except for the VLAN tag to the electro-optical converter 48 or 50 or the external network 18. Accordingly, the VLAN avoids a waste of band caused by broadcast signals.

Although not shown in FIG. 1, it is also applicable to dispose photodiodes to detect whether input signal lights in the photoelectric converters 34 and 36 exist and photodiodes to detect whether output signal lights from the electro-optical converters 48 and 50 and outputs from those photodiodes are applied to the controller 22. With this configuration, the controller 22 can monitor a fault in the route of the monitor control signal light propagating through the signal network.

Figure 3:
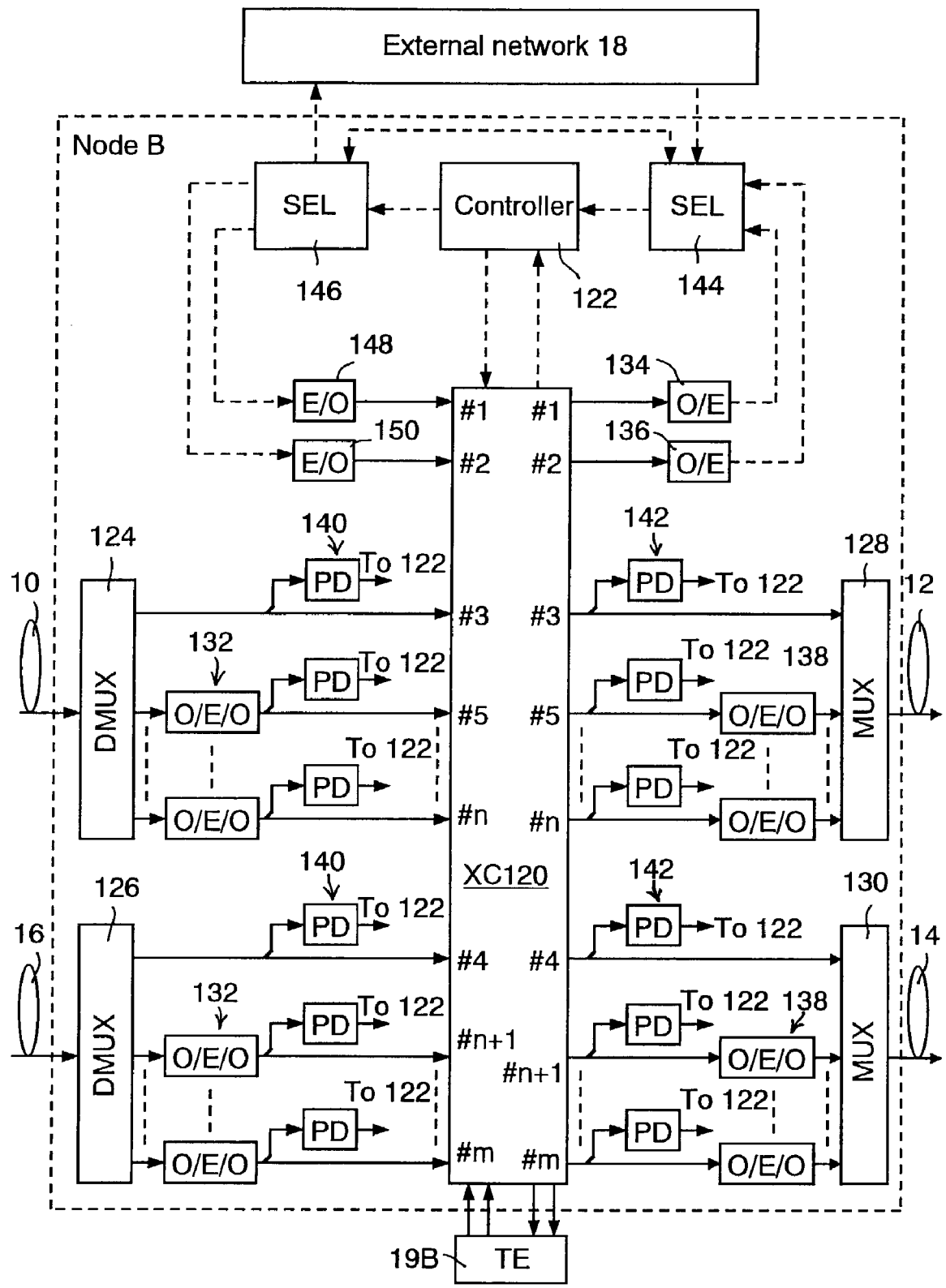
FIG. 3 shows another configuration example of node B.

FIG. 3 shows a modified configuration of node B. In the configuration shown in FIG. 3, the monitor control signal passes an optical crossconnector. Owing to this configuration, a spare wavelength in the internal optical network is used for the transmission of the monitor control signal. Also, the continuity of the monitor control signal can be checked by looping back the monitor control signal.

A controller 122 controls the optical crossconnector 120, monitors each part in the node B and informs the other nodes or a monitor center of the monitor control signal.

A wavelength demultiplexer 124 demultiplexes a WDM signal light input from the node A through the optical fiber 10 into respective wavelengths. A wavelength demultiplexer 126 demultiplexes a WDM signal light input from the node C through the optical fiber 16 into respective wavelengths. In the embodiment shown in FIG. 3, one wavelength is assigned for the transmission of the monitor control signal. The data signal lights demultiplexed by the wavelength demultiplexers 124 and 126 enter respectively input ports #5~#m of the optical crossconnector 120 through corresponding transponders 132. The monitor signal lights demultiplexed by the wavelength demultiplexers 124 and 126 directly enter respectively input ports #3 and #4 of the optical crossconnector 120. The configuration and function of the transponder 132 are identical to those of the transponder 32.

The optical crossconnector 120 comprises two output ports #1 and #2 for outputting monitor control signal lights to be transmitted for the controller 122, two output ports #3 and #4 for outputting monitor control signal lights for the nodes A and C, and a plurality of output ports #5~#m for outputting data signal lights for the nodes A and C. The output port #3 directly connects to a wavelength multiplexer 128, and the output port #4 directly connects to a wavelength multiplexer 130. Each of the output ports #5~#m connects to the wavelength multiplexer 128 or 130 through a corresponding transponder 138 having a function identical to that of the transponder 38.

Needless to say, the optical crossconnector 120 connects to a data transceiver terminal 19B through add ports and drop ports.

The two output ports #1 and #2 and two input ports #1 and #2 are used for transmission with the controller 122. Photoelectric converters 134 and 136 connect to the output ports #1 and #2 of the optical crossconnector 120 respectively, and output lights from electro-optical converters 148 and 150 enter the input ports #1 and #2 of the optical crossconnector 120 respectively.

A photodiode 140 is disposed on each of the input ports #3~#m of the optical crossconnector 120, except for the two input ports #1 and #2 to which output lights from the electro-optical converters 148 and 150 input, so as to monitor whether an input light exists. Also, a photodiode 142 is disposed on each of the output ports #3~#m of the optical crossconnector 120, except for the two output ports #1 and #2 to which the photoelectric converters 134 and 136 connect, so as to monitor whether an output light exists. The reason why not monitor the output lights from the electro-optical converters 148 and 150 and the input light of the photoelectric converters 134 and 136 is to reduce the costs and that there is little necessity. When a general-purpose type is desired, it is applicable to dispose the photodiodes 140, 142 on the input ports #1, #2 and the output ports #1, #2 of the optical crossconnector 120 connecting to those converters.

The photodiodes 140 monitor whether any monitor control signal light having entered the optical crossconnector 120 from the wavelength demultiplexers 124 and 126 exists, and whether any data signal light having output from the transponder 132 and entered the optical crossconnector 120 exists. The photodiodes 142 monitor whether any data signal light and monitor control signal light output from the optical crossconnector 120 for the nodes A and C exist. Each output from the photodiodes 140 and 142 is applied to the controller 122. With this configuration, the controller 122 can monitor the data signal lights and the monitor control lights input/output to/from the optical crossconnector 120.

The selector 144 selects any one of the monitor control signals output from the photoelectric converters 134, 136 and the external network 18 and applies the selected one to the controller 122. The selector 146 applies the monitor control signal output from the controller 122 for the other nodes to any one of the photoelectric converters 134, 136 and the external network 18. The selectors 144 and 146 are practically interlocked. That is, when the selector 144 selects the external network 18, the selector 146 also selects the external network 18. When the selector 144 selects the output from the photoelectric converter 134, the selector 146 selects the electro-optical converter 148. When the selector 144 selects the output from the photoelectric converter 136, the selector 146 selects the electro-optical converter 150. The function of the selector 144, 146 can be identical to that of the selector 44, 46. That is, similarly to the selectors 44 and 46, it is possible to use various switching devices like an IP router and switching hub as the selectors 144 and 146.

The wavelength multiplexer 128 multiplexes a monitor signal light for the node A output from the output port #3 of the optical crossconnector 120 and a data signal light for the node A in the output light from the transponder 138 and outputs the multiplexed lights for the node A through the optical fiber 12. Also, the wavelength multiplexer 130 multiplexes a monitor control light for the node C output from the output port #4 of the optical crossconnector 120 and a data signal light for the node C in the output light from the transponder 138 and outputs the multiplexed lights for the node C through the optical fiber 14.

Furthermore, although the basic function of the controller 122 is almost identical to that of the controller 22, the optical crossconnector 120 is used for transmission of a monitor control signal and thus the controller 122 has an additional function for this purpose.

The transmission of the data signal light is identical to the embodiment shown in FIG. 1. The switching between the internal and external networks for a monitor control signal is also fundamentally identical to the embodiment shown in FIG. 1. Connection check of a monitor control signal which is a characteristic function of the embodiment shown in FIG. 3 is described below.

Figure 4:
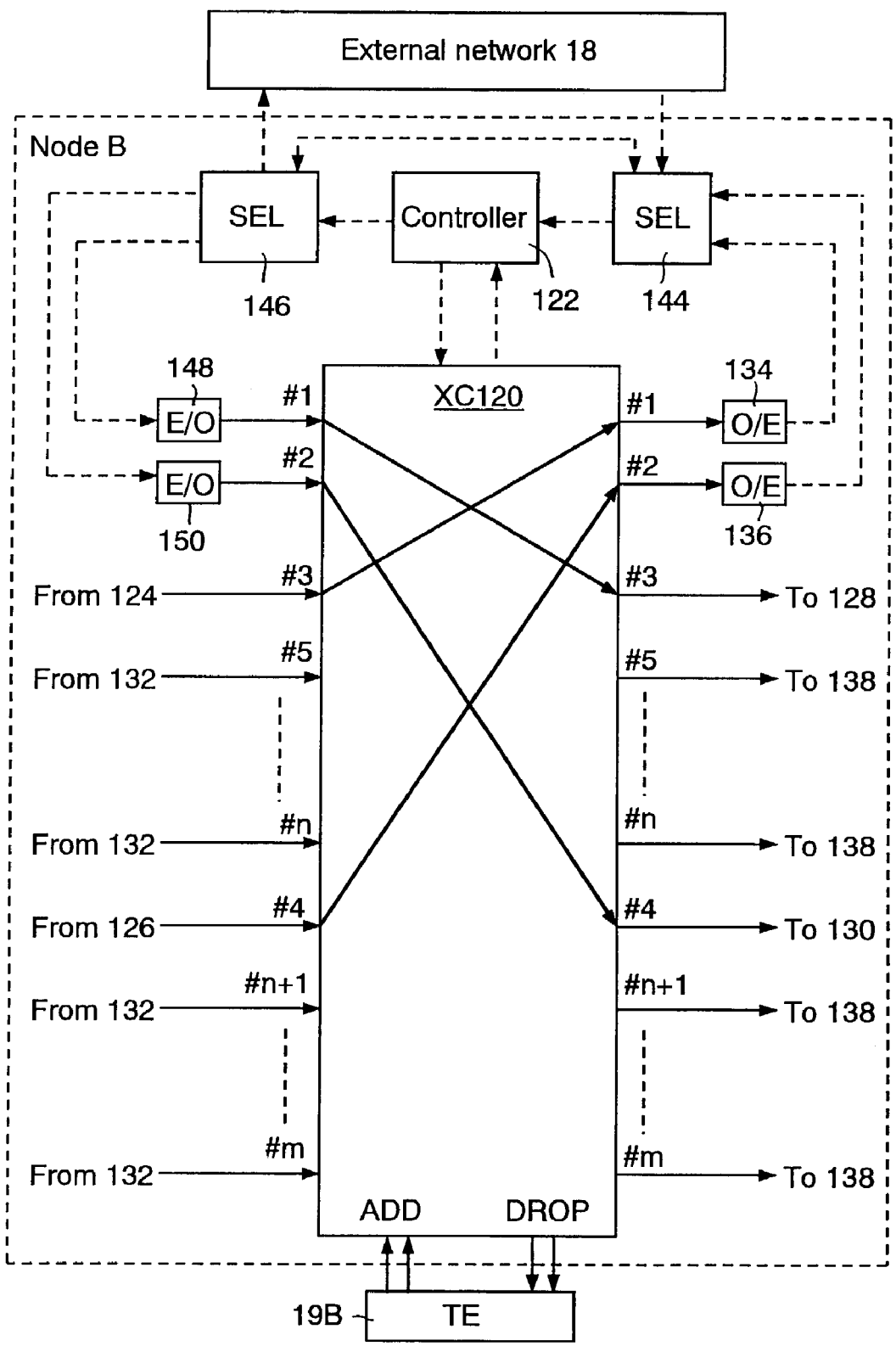
FIG. 4 is a diagram showing internal connection of an optical crossconnector 120 in normal operation.

FIG. 4 shows an internal connection of an optical crossconnector in a normal operation, namely when a monitor control signal transmits on an internal network on which a data signal light propagates. To make it easily understandable, connecting paths of a monitor control signal alone are illustrated. As clearly understandable from FIG. 4, the controller 122 connects the input port #1 of the optical crossconnector 120 to the output port #3, input port #2 to the output port #4, input port #3 to the output port #1, and input port #4 to the output port #2 in a normal operation.

In the internal connecting condition shown in FIG. 4, the monitor control signal output from the node A enters the controller 122 through the optical fiber 10, the wavelength demultiplexer 124, the input port #3 and the output port #1 of the optical crossconnector 120, the photoelectric converter 134, and the selector 144. Similarly, The monitor control signal output from the node C enters the controller 122 through the optical fiber 16, the wavelength demultiplexer 126, the input port #4 and the output port #2 of the optical crossconnector 120, the photoelectric converter 136, and the selector 144.

The monitor control signal for the node A output form the controller 122 enters the node A through the selector 146, electro-optical converter 148, the input port #1 and the output port #3 of the optical crossconnector 120, the wavelength multiplexer 128, and the optical fiber 12. Similarly, the monitor control signal for the node C output from the controller 122 enters the node C through the selector 146, the electro-optical converter 150, the input port #2 and the output port #4 of the optical crossconnector 120, the wavelength multiplexer 130, and the optical fiber 14.

Such function is identical to the embodiment shown in FIG. 1 that a monitor control signal can be transmitted through an external network 18 when the signal network has a fault. Furthermore, in this embodiment, when devices such as a light emission element and a photodetector have a fault instead of a fault in the optical fibers 10~16, it is possible to transmit a monitor control signal on the other channel in the optical fibers 10~16. This is the very merit a monitor control signal enters the optical crossconnector 120. That is, the high-speed protection/restoration by the optical crossconnector 120 can be also used for monitor control signal and a spare band for a monitor control signal can be obtained beforehand.

Figure 5:
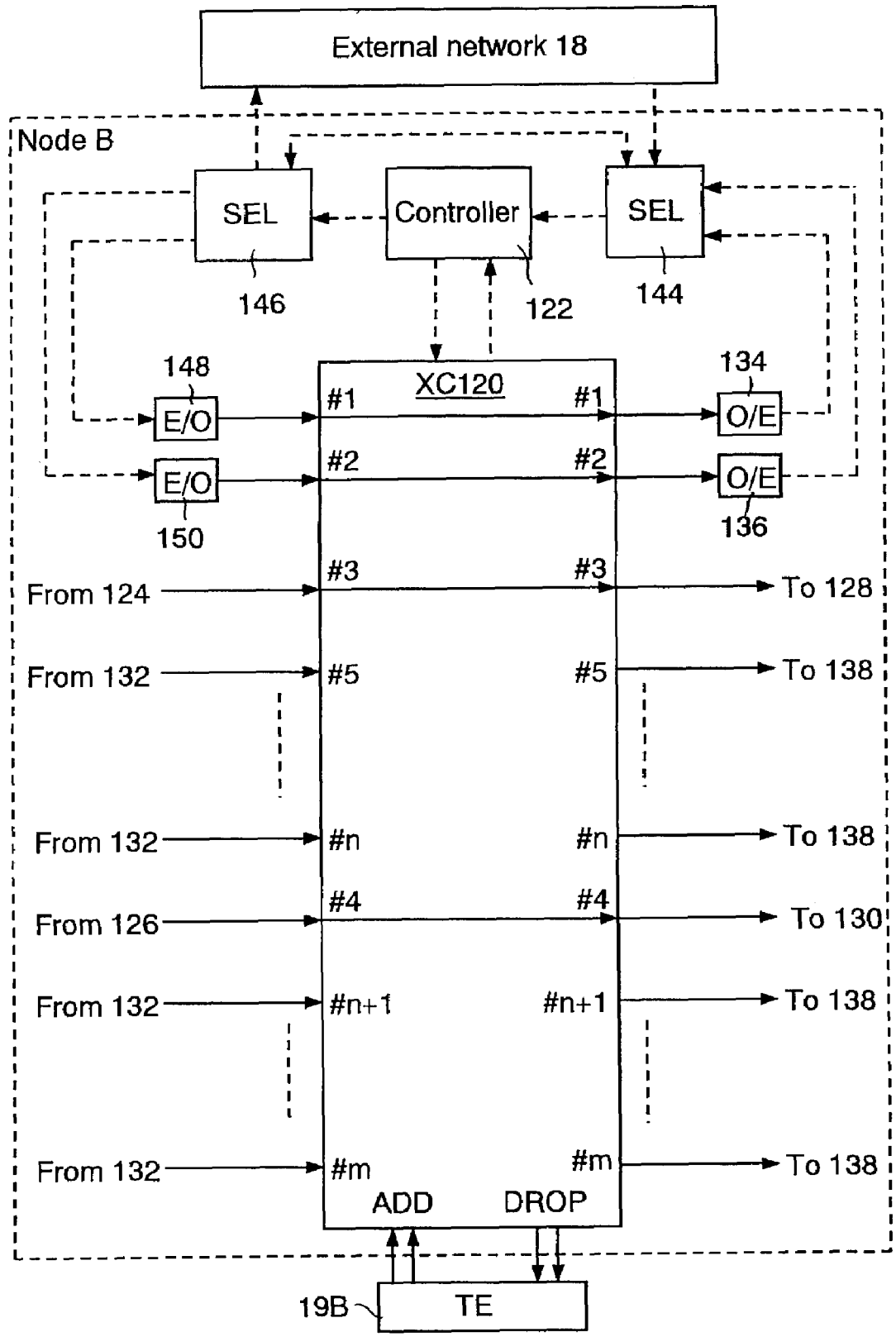
FIG. 5 shows a diagram showing internal connection of the optical crossconnector 120 when a loop back test is performed.

FIG. 5 shows an internal connection of the optical crossconnector 120 at continuity check through a loop back method. When the continuity is checked through a loop back method, the controller 122 connects the input port #1 of the optical crossconnector 120 to the output port #1, the input port #2 to the output port #2, the input port #3 to the output port #3, and the input port #4 to the output port #4.

In the internal connecting condition shown in FIG. 5, a signal output from the electro-optical converter 148 enters the controller 122 through the input port #1 and the output port #1 of the optical crossconnector 120, the photoelectric converter 134, and the selector 144. Also, a signal output from the electro-optical converter 150 enters the controller 122 through the input port #2 and the output port #2 of the optical crossconnector 120, the photoelectric converter 136, and the selector 144. According to this operation, the controller 122 can detects whether the photoelectric converters 134 and 136, the selectors 144 and 146, and the electro-optical converters 148 and 159 operate normally and whether those connecting paths have problems.

Furthermore, as shown in FIG. 5, by connecting the input port #3 to the output port #3 and the input port #4 to the output port #4, the monitor control signal from the node A can be directly transferred to the node C and the monitor control signal from the node C can be directly transferred to the node A. With this operation, a monitor control signal can be transferred between the nodes A and C bypassing the controller 122 in the node B. This can use for check of connecting conditions and detection of fault points.

In the embodiment shown in FIG. 3, a monitor control signal can be distributed by the optical crossconnector 120 to a desired optical path and a desired wavelength channel and thus it is possible, for example, to change channels (optical carrier wavelengths) on the optical fibers 10, 12, 14, and 16. That is, the high-speed protection/restoration by the optical crossconnector 120 can be also used for a monitor control signal. In other words, a spare band for a monitor control signal can be obtained beforehand.

The present invention is also applicable for nodes located on a terminal end in a linear type network. In this case, in FIGS. 1 and 3, for example, the configuration of the node B is used and the configuration element corresponding to the node C should be omitted.

As readily understandable from the aforementioned explanation, according to the invention, a monitor control signal can be transmitted with reliability equivalent to that of a data signal light. In a normal operation, since the monitor control signal transmits on an optical network for the data signal light, there is little transmission delay and also a delay time is stable. When the signal network has a fault, an external network can transmit the monitor control signal and thus the monitor control signal can even obtain the reliability higher than that of the data signal light.

While the invention has been described with reference to the specific embodiment, it will be apparent to those skilled in the art that various changes and modifications can be made to the specific embodiment without departing from the spirit and scope of the invention as defined in the claims.

The invention claimed is:

1. A data transmission system comprising:
a first network to optically transmit a data signal and a monitor control signal in an optical signal;
first and second nodes connecting to the first network; and
a second network capable of transmitting an alternate monitor control signal;
wherein the first node comprises,
a demultiplexer to demultiplex the data signal and the monitor control signal out of the optical signal from the first network;
a signal distributor having a plurality of input ports and a plurality of output ports to distribute the data signal demultiplexed by the demultiplexer to a designated one of the plurality of output ports;
a controller to control the signal distributor and to monitor each port in the first node;
a first selector to select one of the monitor control signal demultiplexed by the demultiplexer and the alternate monitor control signal received from the second network and to apply the selected monitor control signal to the controller;
a second selector to output a monitor control signal output for the second node, output from the controller, toward one of the first network and the second network; and
a multiplexer to multiplex the monitor control signal output for the first network, output from the second selector, and the data signal output from the signal distributor and to output the multiplexed signals onto the first network.

2. The system of claim 1 wherein the first and second selectors are interlocked with each other.

3. The system of claim 1 wherein each of the first and second selectors comprises an IP router.

4. The system of claim 1 wherein each of the first and second selectors comprises a switching hub.

5. The system of claim 1 wherein the signal distributor comprises an optical crossconnector.

6. The system of claim 1 wherein the signal distributor comprises an optical crossconnector, an input detector to detect whether an input light exists in a predetermined one of the plurality of input ports of the optical crossconnector, and an output detector to detect whether an output light exists in a predetermined one of the plurality of output ports of the optical cross connector.

7. The system of claim 1 further comprising a first data transceiver terminal to transmit or receive a transceiver data to or from the first node, wherein
the signal distributor distributes the data signal designated for the data transceiver terminal demultiplexed by the demultiplexer to the data transceiver terminal and distributes the transceiver data signal from the data transceiver terminal to a predetermined output port.

8. A data transmission system comprising:
a first network to optically transmit a data signal and a monitor control signal in an optical signal;
first and second nodes connecting to the first network;
a first data transceiver terminal to transmit or receive first data to or from the first node;
a second data transceiver terminal to transmit or receive second data to or from the second node; and
a second network capable of transmitting an alternate monitor control signal;
wherein the first node comprises,
a demultiplexer to demultiplex the data signal and the monitor control signal out of the optical signal from the first network;
a signal distributor having a plurality of input ports including first and second monitor control signal input ports and a plurality of output ports including first and second monitor control signal output ports to distribute the data signal and the monitor control signal demultiplexed by the demultiplexer to respective a designated one of the plurality of output ports, the signal distributor connecting the first monitor control signal input port to the second monitor control signal output port and the second monitor control signal input port to the first monitor control signal output port when the first network is normally operating;
a controller to control the signal distributor and to monitor each port in the first node;
a first selector to select either the monitor control signal output from the first monitor control signal output port of the signal distributor or the alternate monitor control signal received from the second network and to apply the selected monitor control signal to the controller;
a second selector to output the monitor control signal output for the second node, output by controller, toward either the first monitor control signal input port of the signal distributor or the second network; and
a multiplexer to multiplex the monitor control signal output from the second monitor signal output port of the signal distributor and the data signal output from the signal distributor and to output the multiplexed signals to the first optical network.

9. The system of claim 8 wherein the first and second selectors are interlocked each other.

10. The system of claim 8 wherein each of the first and second selectors comprises an IP router.

11. The system of claim 8 wherein each of the first and second selectors comprises a switching hub.

12. The system of claim 8 wherein the signal distributor comprises an optical crossconnector.

13. The system of claim 8 wherein the signal distributor comprises an optical crossconnector, an input detector to detect whether an input light exists in a predetermined one of the plurality if input ports of the optical crossconnector, and an output detector to detect whether an output light exists in a predetermined one of the plurality of output ports of the optical crossconnector.

14. A node for connecting to a first network that optically transmits a data signal and a monitor control signal and a second network capable of transmitting an alternate monitor control signal, the node comprising:
a demultiplexer to demultiplex the data signal and the monitor control signal out of a signal light input from the first network;
a signal distributor having a plurality of input ports and a plurality of output ports to distribute the data signal demultiplexed by the demultiplexer to a respective predetermined one of the plurality of output ports;
a controller to control the signal distributor and to monitor each port;
a first selector to select one of the monitor control signal demultiplexed by the demultiplexer and the alternate monitor control signal input from the second network and to apply the selected monitor control signal to the controller;
a second selector to output a monitor control signal for a second node, output by the controller, toward one of the first network and the second network; and
a multiplexer to multiplex themonitor control signal forth first network, output from the second selector, and the data signal from the signal distributor and to output the multiplexed signals for the first optical network.

15. The node of claim 14 wherein the first and second selectors are interlocked each other.

16. The node of claim 14 wherein each of the first and second selectors comprises an IP router.

17. The node of claim 14 wherein each of the first and second selectors comprises a switching hub.

18. The node of claim 14 wherein the signal distributor comprises an optical crossconnector.

19. The node of claim 14 wherein the signal distributor comprises an optical crossconnector, an input detector to detect whether an input light exists in a predetermined one of the plurality of input ports of the optical crossconnector, and an output detector to detect whether an output light exists in a predetermined one of the plurality of output ports of the optical crossconnector.

20. A node for connecting to a first network that optically transmits a data signal and a monitor control signal and a second network capable of transmitting an alternate monitor control signal, the node comprising:
a demultiplexer to demultiplex the data signal and the monitor control signal out of signal light input from the first network;
a signal distributor having a plurality of input ports including first and second monitor control signal input ports and a plurality of output ports including first and second monitor control signal output ports to distribute the data signal arid the monitor control signal demultiplexed by the demultiplexer to a respective predetermined one of the plurality of output ports, the signal distributor connecting the first monitor control signal input port with the second monitor control signal output port and the second monitor control signal input port with the first monitor control signal output port when the first network is normally operating;
a controller to control the signal distributor and to monitor each port;
a first selector to select one of the monitor control signal output from the first monitor control signal output port of the signal distributor and the alternate monitor control signal input from the second network and to apply the selected one to the controller;
a second selector to output a motor control signal for a second node, output by the controller, toward one of the first monitor control signal input port of the signal distributor and the second network; and
a multiplexer to multiplex the monitor control signal output from the second monitor control signal output port of the signal distributor and the data signal from the signal distributor and to output the multiplexed signals for the first network.

21. The node of claim 20 wherein the first and second selectors are interlocked each other.

22. The node of claim 20 wherein each of the first and second selectors comprises an IP router.

23. The node of claim 20 wherein each of the first and second selectors comprises a switching hub.

24. The node of claim 20 wherein the signal distributor comprises an optical crossconnector.

25. The node of claim 20 wherein the signal distributor comprises an optical crossconnector, an input detector to detect whether an input light exists in a predetermined one of the plurality of input ports of the optical crossconnector, and an output detector to detect whether an output light exists in a predetermined one of the plurality of output ports of the optical cross connector.

* * * * *